United States Patent
Cheng et al.

(10) Patent No.: US 8,446,914 B2
(45) Date of Patent: May 21, 2013

(54) METHOD AND SYSTEM FOR LINK AGGREGATION ACROSS MULTIPLE SWITCHES

(75) Inventors: Joseph Juh-En Cheng, Palo Alto, CA (US); Wing Cheung, Fremont, CA (US); John Michael Terry, San Jose, CA (US); Suresh Vobbilisetty, San Jose, CA (US); Surya P. Varanasi, Dublin, CA (US); Parviz Ghalambor, Los Altos, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 18 days.

(21) Appl. No.: 13/092,864

(22) Filed: Apr. 22, 2011

(65) Prior Publication Data

US 2011/0299536 A1 Dec. 8, 2011

Related U.S. Application Data

(60) Provisional application No. 61/352,720, filed on Jun. 8, 2010.

(51) Int. Cl.
*H04L 12/56* (2006.01)
(52) U.S. Cl.
USPC ............ 370/401; 370/217; 370/244; 370/392
(58) Field of Classification Search
USPC ................. 370/216, 217, 218, 241, 242, 244, 370/250, 389, 392, 400, 401
See application file for complete search history.

(56) References Cited

U.S. PATENT DOCUMENTS

| | | | |
|---|---|---|---|
| 6,085,238 A | 7/2000 | Yuasa | |
| 6,185,241 B1 | 2/2001 | Sun | |
| 6,542,266 B1 | 4/2003 | Phillips | |
| 6,873,602 B1 | 3/2005 | Ambe | |
| 7,173,934 B2 | 2/2007 | Lapuh | |
| 7,206,288 B2 | 4/2007 | Cometto | |
| 7,310,664 B1 | 12/2007 | Merchant | |
| 7,313,637 B2 | 12/2007 | Tanaka | |
| 7,330,897 B2 | 2/2008 | Baldwin | |
| 7,380,025 B1 | 5/2008 | Riggins | |
| 7,558,195 B1 * | 7/2009 | Kuo et al. | 370/219 |

(Continued)

FOREIGN PATENT DOCUMENTS

| | | |
|---|---|---|
| EP | 1916807 A2 | 4/2008 |
| EP | 2001167 A1 | 12/2008 |

OTHER PUBLICATIONS

Trill Working Group; Internet-Draft; Intended status: Proposed Standard; Expires: Sep. 2, 2010; Mar. 3, 2010; "RBridges: Base Specification".*

(Continued)

*Primary Examiner* — Chi Pham
*Assistant Examiner* — Weibin Huang
(74) *Attorney, Agent, or Firm* — Shun Yao; Park, Vaughan, Fleming & Dowler LLP

(57) ABSTRACT

One embodiment of the present invention provides a switch. The switch includes a forwarding mechanism and a control mechanism. During operation, the forwarding mechanism forwards frames based on their Ethernet headers. The control mechanism operates the switch in conjunction with a separate physical switch as a single logical switch and assigns a virtual switch identifier to the logical switch, wherein the virtual switch identifier is associated with a link aggregation group.

23 Claims, 7 Drawing Sheets

U.S. PATENT DOCUMENTS

| | | |
|---|---|---|
| 7,558,273 B1 | 7/2009 | Grosser, Jr. |
| 7,787,480 B1 | 8/2010 | Mehta |
| 7,792,920 B2 | 9/2010 | Istvan |
| 7,808,992 B2 | 10/2010 | Homchaudhuri |
| 7,836,332 B2 | 11/2010 | Hara |
| 7,843,907 B1 | 11/2010 | Abou-Emara |
| 7,860,097 B1 | 12/2010 | Lovett |
| 7,949,638 B1 | 5/2011 | Goodson |
| 7,957,386 B1 | 6/2011 | Aggarwal |
| 8,027,354 B1 | 9/2011 | Portolani |
| 8,054,832 B1 | 11/2011 | Shukla |
| 8,078,704 B2 | 12/2011 | Lee |
| 8,134,922 B2 | 3/2012 | Elangovan |
| 8,170,038 B2 | 5/2012 | Belanger |
| 8,194,674 B1 | 6/2012 | Pagel |
| 8,195,774 B2 | 6/2012 | Lambeth |
| 8,213,336 B2 | 7/2012 | Smith |
| 8,230,069 B2 | 7/2012 | Korupolu |
| 8,295,291 B1 | 10/2012 | Ramanathan |
| 8,301,686 B1 | 10/2012 | Appajodu |
| 2002/0021701 A1 | 2/2002 | Lavian |
| 2002/0091795 A1 | 7/2002 | Yip |
| 2003/0041085 A1 | 2/2003 | Sato |
| 2003/0189905 A1 | 10/2003 | Lee |
| 2004/0120326 A1 | 6/2004 | Yoon |
| 2004/0165595 A1 | 8/2004 | Holmgren |
| 2005/0007951 A1 | 1/2005 | Lapuh |
| 2005/0044199 A1 | 2/2005 | Shiga |
| 2005/0094568 A1 | 5/2005 | Judd |
| 2005/0094630 A1 | 5/2005 | Valdevit |
| 2005/0122979 A1 | 6/2005 | Gross |
| 2005/0169188 A1 | 8/2005 | Cometto |
| 2005/0195813 A1 | 9/2005 | Shekhar |
| 2005/0265356 A1 | 12/2005 | Kawarai |
| 2006/0018302 A1 | 1/2006 | Ivaldi |
| 2006/0062187 A1 | 3/2006 | Rune |
| 2006/0083254 A1 | 4/2006 | Ge |
| 2006/0184937 A1 | 8/2006 | Abels |
| 2006/0221960 A1 | 10/2006 | Borgione |
| 2006/0235995 A1 | 10/2006 | Bhatia |
| 2006/0242311 A1 | 10/2006 | Mai |
| 2006/0251067 A1 | 11/2006 | DeSanti |
| 2006/0265515 A1 | 11/2006 | Shiga |
| 2007/0116422 A1 | 5/2007 | Burke |
| 2007/0274234 A1 | 11/2007 | Kubota |
| 2008/0052487 A1 | 2/2008 | Akahane |
| 2008/0065760 A1 | 3/2008 | Damm |
| 2008/0080517 A1 | 4/2008 | Roy |
| 2008/0101386 A1 | 5/2008 | Gray |
| 2008/0133760 A1 | 6/2008 | Berkvens et al. |
| 2008/0159277 A1* | 7/2008 | Vobbilisetty et al. ......... 370/357 |
| 2008/0172492 A1 | 7/2008 | Raghunath et al. |
| 2008/0181196 A1 | 7/2008 | Regan |
| 2008/0186981 A1 | 8/2008 | Seto |
| 2008/0205377 A1 | 8/2008 | Chao |
| 2008/0219172 A1 | 9/2008 | Mohan |
| 2008/0225853 A1 | 9/2008 | Melman |
| 2008/0285555 A1 | 11/2008 | Ogasahara |
| 2008/0298248 A1 | 12/2008 | Roeck |
| 2009/0067422 A1 | 3/2009 | Poppe |
| 2009/0083445 A1 | 3/2009 | Ganga |
| 2009/0092042 A1 | 4/2009 | Yuhara |
| 2009/0106405 A1 | 4/2009 | Mazarick |
| 2009/0199177 A1 | 8/2009 | Edwards |
| 2009/0204965 A1 | 8/2009 | Tanaka |
| 2009/0245137 A1* | 10/2009 | Hares et al. ............ 370/254 |
| 2009/0245242 A1 | 10/2009 | Carlson |
| 2009/0260083 A1 | 10/2009 | Szeto |
| 2009/0323708 A1 | 12/2009 | Ihle |
| 2009/0327392 A1 | 12/2009 | Tripathi |
| 2009/0327462 A1 | 12/2009 | Adams |
| 2010/0061269 A1 | 3/2010 | Banerjee |
| 2010/0074175 A1 | 3/2010 | Banks |
| 2010/0103813 A1 | 4/2010 | Allan |
| 2010/0103939 A1 | 4/2010 | Carlson |
| 2010/0131636 A1 | 5/2010 | Suri |
| 2010/0158024 A1 | 6/2010 | Sajassi |
| 2010/0165877 A1 | 7/2010 | Shukia |
| 2010/0165995 A1 | 7/2010 | Mehta |
| 2010/0169467 A1 | 7/2010 | Shukia |
| 2010/0226381 A1 | 9/2010 | Mehta |
| 2010/0246388 A1 | 9/2010 | Gupta |
| 2010/0271960 A1 | 10/2010 | Krygowski |
| 2010/0281106 A1 | 11/2010 | Ashwood-Smith |
| 2010/0287548 A1 | 11/2010 | Zhou |
| 2010/0290473 A1 | 11/2010 | Enduri |
| 2010/0309820 A1 | 12/2010 | Rajagopalan |
| 2011/0019678 A1 | 1/2011 | Mehta |
| 2011/0035498 A1 | 2/2011 | Shah |
| 2011/0044339 A1* | 2/2011 | Kotalwar et al. ............ 370/392 |
| 2011/0085560 A1 | 4/2011 | Chawla |
| 2011/0085563 A1 | 4/2011 | Kotha |
| 2011/0134925 A1 | 6/2011 | Safrai |
| 2011/0142053 A1 | 6/2011 | Van Der Merwe |
| 2011/0142062 A1 | 6/2011 | Wang |
| 2011/0161695 A1 | 6/2011 | Okita |
| 2011/0194403 A1 | 8/2011 | Sajassi |
| 2011/0235523 A1 | 9/2011 | Jha |
| 2011/0243133 A9 | 10/2011 | Villait |
| 2011/0243136 A1 | 10/2011 | Raman |
| 2011/0246669 A1 | 10/2011 | Kanada |
| 2011/0255538 A1 | 10/2011 | Srinivasan |
| 2011/0255540 A1 | 10/2011 | Mizrahi |
| 2011/0268120 A1 | 11/2011 | Vobbilisetty |
| 2011/0296052 A1 | 12/2011 | Guo |
| 2011/0299414 A1 | 12/2011 | Yu |
| 2011/0299527 A1 | 12/2011 | Yu |
| 2011/0299528 A1 | 12/2011 | Yu |
| 2011/0299531 A1 | 12/2011 | Yu |
| 2011/0299532 A1 | 12/2011 | Yu |
| 2011/0299533 A1 | 12/2011 | Yu |
| 2011/0299536 A1 | 12/2011 | Cheng |
| 2012/0011240 A1 | 1/2012 | Hara |
| 2012/0014387 A1 | 1/2012 | Dunbar |
| 2012/0027017 A1 | 2/2012 | Rai |
| 2012/0131097 A1 | 5/2012 | Baykal |
| 2012/0163164 A1 | 6/2012 | Terry |

OTHER PUBLICATIONS

"Switched Virtual Internetworking moved beyond bridges and routers", 8178 Data Communications 23(1994) Sep., No. 12, New York.

S. Night et al., "Virtual Router Redundancy Protocol", Network Working Group, XP-002135272, Apr. 1998.

Eastlake 3rd., Donald et al., "RBridges: TRILL Header Options", Draft-ietf-trill-rbridge-options-00.txt, Dec. 24, 2009.

J. Touch, et al., "Transparent Interconnection of Lots of Links (TRILL): Problem and Applicability Statement", May 2009.

Perlman, Radia et al., "RBridge VLAN Mapping", Draft-ietf-trill-rbridge-vlan-mapping-01.txt, Dec. 4, 2009.

Brocade Fabric OS (FOS) 6.2 Virtual Fabrics Feature Frequently Asked Questions.

Perlman, Radia "Challenges and Opportunities in the Design of TRILL: a Routed layer 2 Technology", XP-002649647, 2009.

Nadas, S. et al., "Virtual Router Redundancy Protocol (VRRP) Version 3 for IPv4 and IPv6", Mar. 2010.

Perlman, Radia et al., "RBridges: Base Protocol Specification", draft-ietf-trill-rbridge-protocol-16.txt, Mar. 3, 2010.

Christensen, M. et al., "Considerations for Internet Group Management Protocol (IGMP) and Multicast Listener Discovery (MLD) Snooping Switches", May 2006.

Lapuh, Roger et al., "Split Multi-link Trunking (SMLT)", Oct. 2002.

Lapuh, Roger et al., "Split Multi-link Trunking (SMLT) draft-lapuh-network-smlt-08", 2008.

Eastlake 3rd., Donald et al., "RBridges: TRILL Header Options", Draft-ietf-trill-rbridge-options-00.txt Dec. 24, 2009.

* cited by examiner

METHOD AND SYSTEM FOR LINK AGGREGATION ACROSS MULTIPLE SWITCHES

RELATED APPLICATIONS

This application claims the benefit of U.S. Provisional Application No. 61/352,720, entitled "Method and Apparatus For Link Aggregation Across Multiple Switches," by inventors Joseph Juh-En Cheng, Wing Cheung, John Michael Terry, Suresh Vobbilisetty, Surya P. Varanasi, and Parviz Ghalambor, filed 8 Jun. 2010, the disclosure of which is incorporated by reference herein.

The present disclosure is related to U.S. patent application Ser. No. 12/725,249, entitled "REDUNDANT HOST CONNECTION IN A ROUTED NETWORK," by inventors Somesh Gupta, Anoop Ghanwani, Phanidhar Koganti, and Shunjia Yu, filed 16 Mar. 2010; and U.S. patent application Ser. No. 13/087,239, entitled "VIRTUAL CLUSTER SWITCHING," by inventors Suresh Vobbilisetty and Dilip Chatwani, filed 14 Apr. 2011;

the disclosures of which are incorporated by reference herein.

BACKGROUND

1. Field

The present disclosure relates to network management. More specifically, the present disclosure relates to a method and system for link aggregation across multiple switches.

2. Related Art

As more mission-critical applications are being implemented in data communication networks, high-availability operation is becoming progressively more important as a value proposition for network architects. It is often desirable to divide a conventional aggregated link (from one device to another) among multiple network devices, such that a node failure or link failure would not affect the operation of the multi-homed device.

Meanwhile, layer-2 (e.g., Ethernet) networking technologies continue to evolve. More routing-like functionalities, which have traditionally been the characteristics of layer-3 (e.g., IP) networks, are migrating into layer-2. Notably, the recent development of the Transparent Interconnection of Lots of Links (TRILL) protocol allows Ethernet switches to function more like routing devices. TRILL overcomes the inherent inefficiency of the conventional spanning tree protocol, which forces layer-2 switches to be coupled in a logical spanning-tree topology to avoid looping. TRILL allows routing bridges (RBridges) to be coupled in an arbitrary topology without the risk of looping by implementing routing functions in switches and including a hop count in the TRILL header.

While TRILL brings many desirable features to layer-2 networks, some issues remain unsolved when TRILL-capable devices are coupled with non-TRILL devices. Particularly, when a non-TRILL device is coupled to multiple TRILL devices using link aggregation, existing technologies do not provide a scalable and flexible solution that takes full advantage of the TRILL network.

SUMMARY

One embodiment of the present invention provides a switch. The switch includes a forwarding mechanism and a control mechanism. During operation, the forwarding mechanism forwards frames based on their Ethernet headers. The control mechanism operates the switch in conjunction with a separate physical switch as a single logical switch and assigns a virtual switch identifier to the logical switch, wherein the virtual switch identifier is associated with a link aggregation group.

In a variation on this embodiment, the switch is a layer-2 switch capable of routing without requiring the network topology to be based on a spanning tree.

In a variation on this embodiment, the switch is a routing bridge configured to operate in accordance with the TRILL protocol.

In a variation on this embodiment, the control mechanism derives the virtual switch identifier based on an identifier for the link aggregation group.

In a variation on this embodiment, the switch includes a frame-marking mechanism configured to mark an ingress-switch field of a frame with the virtual switch identifier, wherein the frame is received from a device coupled to the switch.

In a variation on this embodiment, the virtual switch identifier is a virtual RBridge identifier in compliance with the TRILL protocol.

In a variation on this embodiment, the link aggregation group is identified by a LAG ID in accordance to the IEEE 802.1ax standard.

DETAILED DESCRIPTION

Figure 1:
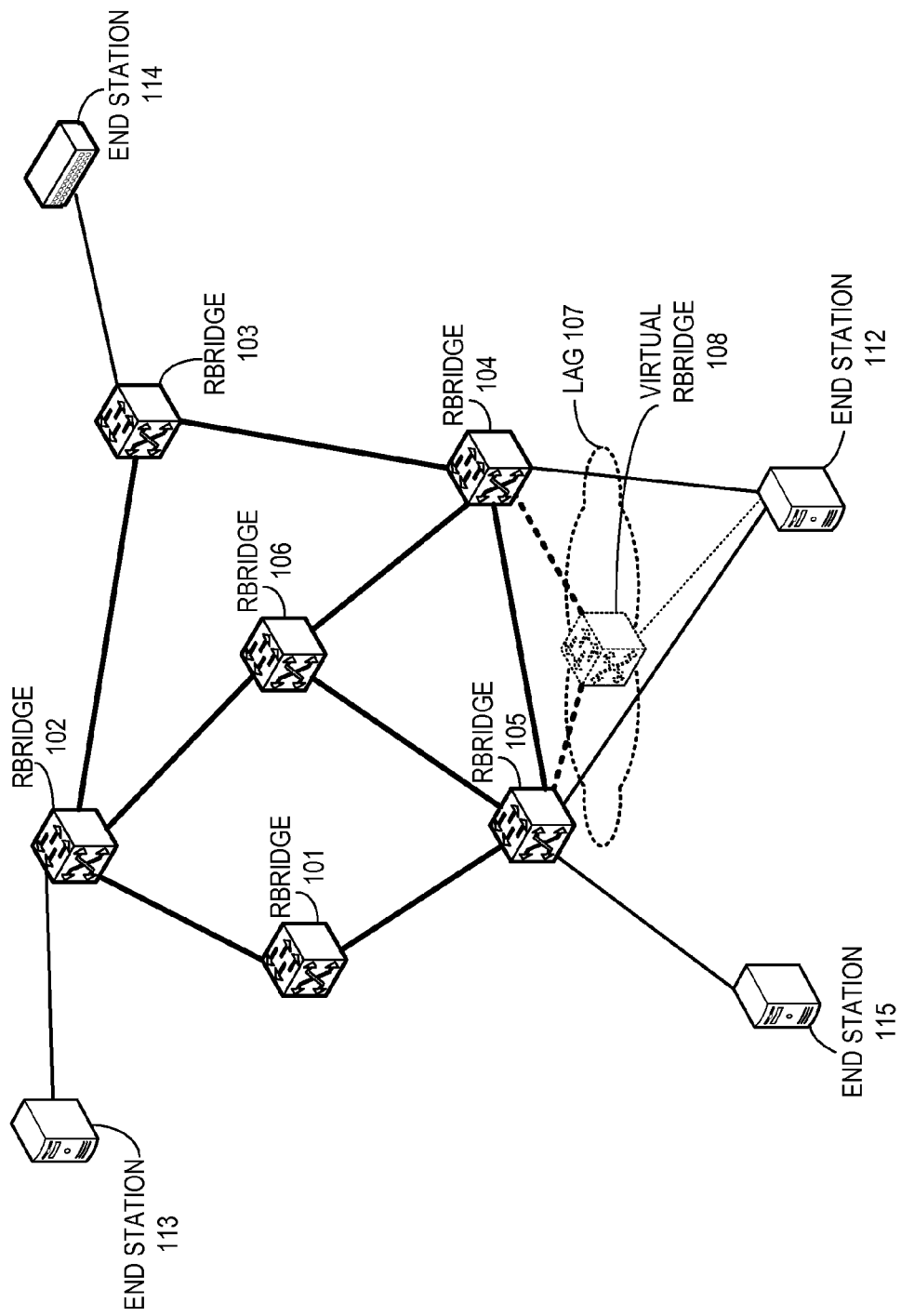
FIG. 1 illustrates an exemplary network where a virtual RBridge identifier is assigned to two physical TRILL RBridges which are coupled to a non-TRILL device via a divided aggregate link, in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Overview

In embodiments of the present invention, the problem of providing a scalable and flexible way of provisioning multi-switch link aggregation in a TRILL network is solved by forming a logical, virtual RBridge corresponding to a link aggregation group across multiple RBridges and assigning a virtual RBridge identifier based on the link aggregation group (LAG) identifier. For example, in a TRILL network, when an end station is coupled to two separate RBridges and the links to these RBridges form a LAG, a virtual TRILL RBridge identifier (ID) is generated based on the LAG ID, and the end station is considered to be logically coupled to the virtual RBridge. An incoming frame from the end-station is marked with a virtual RBridge nickname as its ingress RBridge nickname and routed through the rest of the TRILL network. To the rest of the TRILL network, such a dual-homed end station appears to be coupled to the virtual RBridge. When one of the aggregated links fails, the affected end station is no longer considered coupled to the virtual RBridge. Instead, the end station would be considered to be coupled to the physical RBridge with an operational link. This configuration allows fast protection switching and timely topology convergence.

Although the present disclosure is presented using examples based on the TRILL protocol, embodiments of the present invention are not limited to TRILL networks, or networks defined in a particular Open System Interconnection Reference Model (OSI reference model) layer.

The term "RBridge" refers to routing bridges, which are bridges implementing the TRILL protocol as described in IETF draft "RBridges: Base Protocol Specification," available at http://tools.ietf.org/html/draft-ietf-trill-rbridge-protocol-16, which is incorporated by reference herein. Embodiments of the present invention are not limited to the application among RBridges. Other types of switches, routers, and forwarders can also be used.

The term "end station" refers to a network device that is not TRILL-capable. "End station" is a relative term with respect to the TRILL network. However, "end station" does not necessarily mean that the network device is an end host. An end station can be a host, a conventional layer-2 switch, an IP router, or any other type of network device. Additionally, an end station can be coupled to other switches, routers, or hosts further away from the TRILL network. In other words, an end station can be an aggregation point for a number of network devices to enter the TRILL network.

The term "dual-homed end station" refers to an end station that has an aggregate link to two or more TRILL RBridges, where the aggregate link includes multiple physical links to the different RBridges. The aggregate link, which includes multiple physical links, functions as one logical link to the end station. Although the term "dual" is used here, the term "dual-homed end station" does not limit the number of physical RBridges sharing the aggregate link to two. In various embodiments, other numbers of physical RBridges can share the same aggregate link. Where "dual-homed end station" is used in the present disclosure, the term "multi-homed end station" can also be used.

The term "frame" refers to a group of bits that can be transported together across a network. "Frame" should not be interpreted as limiting embodiments of the present invention to layer-2 networks. "Frame" can be replaced by other terminologies referring to a group of bits, such as "packet," "cell," or "datagram."

The term "RBridge identifier" refers to a group of bits that can be used to identify an RBridge. Note that the TRILL standard uses "RBridge ID" to denote a 48-bit intermediate-system-to-intermediate-system (IS-IS) System ID assigned to an RBridge, and "RBridge nickname" to denote a 16-bit value that serves as an abbreviations for the "RBridge ID." In this disclosure, "RBridge identifier" is used as a generic term and is not limited to any bit format, and can refer to "RBridge ID" or "RBridge nickname" or any other format that can identify an RBridge.

Network Architecture

FIG. 1 illustrates an exemplary network where a virtual TRILL identifier is assigned to two physical TRILL RBridges which are coupled to a non-TRILL device via a divided aggregate link, in accordance with an embodiment of the present invention. As illustrated in FIG. 1, a TRILL network includes six RBridges, 101, 102, 103, 104, 105, and 106. End station 113 is coupled to RBridge 102; end station 114 is coupled to RBridge 103; and end station 115 is coupled to RBridge 105. End station 112 is dual-homed and coupled to RBridges 104 and 105. The goal is to allow a dual-homed end station to use both physical links to two separate TRILL RBridges as a single, logical aggregate link. Such a configuration would achieve true redundancy and facilitate fast protection switching.

However, in a conventional TRILL network, the dual-home-style connectivity would not provide the desired result, because the TRILL protocol depends on MAC address learning to determine the location of end stations (i.e., to which ingress RBridge an end station is coupled) based on a frame's ingress TRILL RBridge ID. As such, an end station can only appear to be reachable via a single physical RBridge. For example, assume that end station 112 is in communication with end station 113. The ingress RBridge would be RBridges 105 and 104, and the egress RBridge would be RBridge 102. The incoming frames from end station 112 would have either RBridge 104 or RBridge 105 marked as their ingress RBridge ID. When RBridge 102 receives these frames and performs MAC address learning, RBridge 102 would assume that end station 112 is moving and is either coupled to RBridge 104 or RBridge 105 (but not both). RBridge 102 would send the frames from end station 113 to either RBridge 104 or RBridge 105. Consequently, only one of the physical links leading to end station 112 is used, which defeats the purpose of having redundant links between end station 112 and RBridges 104 and 105.

In embodiments of the present invention, as illustrated in FIG. 1, RBridges 104 and 105 are configured to operate in a special "trunked" mode for end station 112. End stations 112 view RBridges 104 and 105 as part of one single logical switch. Dual-homed end station 112 is considered to be logically coupled to virtual RBridge 108 via logical links represented by the dotted line. Virtual RBridge 108 is considered to be logically coupled to both RBridges 104 and 105, optionally with zero-cost links (also represented by dotted lines).

From end station 112's point of view, it forms a link aggregation group (LAG) with the single logical switch represented by RBridges 105 and 104. During link bring-up, the link layer discovery protocol (LLDP) instances on both end station 112 and RBridges 105 and 104 negotiate the LAG ID for LAG 107, which includes the two physical links between end station 112 and RBridges 105 and 104. The corresponding ports on RBridges 105 and 104 are mapped to the same LAG ID. More details about the LAG ID negotiation process can be found in the IEEE 802.1AX standard, available at http://standards.ieee.org/getieee802/download/802.1AX-2008.pdf, which is incorporated by reference herein.

In one embodiment, virtual RBridge 108's identifier can be derived from the LAG ID. That is, once the LAG negotiation is complete, the virtual RBridge ID can be determined. This configuration allows a one-to-one mapping relationship between the virtual RBridge ID and the LAG ID.

Incoming frames from end station 112 are marked with virtual RBridge 108's nickname as their ingress RBridge nickname. As a result, other RBridges in the TRILL network can learn that end station 112 is reachable via virtual RBridge 108. Furthermore, RBridges 104 and 105 can advertise their respective connectivity (optionally via zero-cost links) to virtual RBridge 108. Hence, multi-pathing can be achieved when other RBridges choose to send frames to virtual RBridge 108 (which is marked as the egress RBridge in the frames) via RBridges 104 and 105. In the following description, RBridges which participate in link aggregation and form a virtual RBridge are referred to as "partner RBridges."

Since the two partner RBridges function as a single logical RBridge, the MAC address reachability learned by each RBridge is shared with the other partner RBridge. For example, during normal operation, end station 112 may choose to send its outgoing frames only via the link to RBridge 105. As a result, only RBridge 105 would learn end station 112's MAC address (and the corresponding port on RBridge 105 to which end station 112 is coupled). This information is then shared by RBridge 105 with RBridge 104. Since the frames coming from end station 112 would have virtual RBridge 108's nickname as their ingress RBridge nickname, when other devices in the network send frames back to end station 112, these frames would have virtual RBridge 108's nickname as their egress RBridge nickname, and these frames might be sent to either RBridge 104 or 105. When RBridge 104 receives such a frame, it can determine that this frame should be sent to its partner RBridge 105, based on the MAC reachability information shared by RBridge 105.

An end station is not required to change the way it is configured for link aggregation. A dual-homed end station only needs to be configured to have a LAG to the RBridges, as would be the case with a conventional, physical RBridge, using an existing link aggregation method. Hence, the dual-homed end station does not need to be aware that the virtual RBridge on the other end of the aggregate link is actually two physical RBridges. Furthermore, the rest of the TRILL network (apart from RBridges 104 and 105) is also not required to be aware that virtual RBridge 108 is actually not a physical RBridge. That is, to the rest of the TRILL network, virtual RBridge 108 is indistinguishable from any of the physical RBridges. Therefore, the present invention does not require extra configuration to the rest of the TRILL network.

Frame Processing

Figure 2:
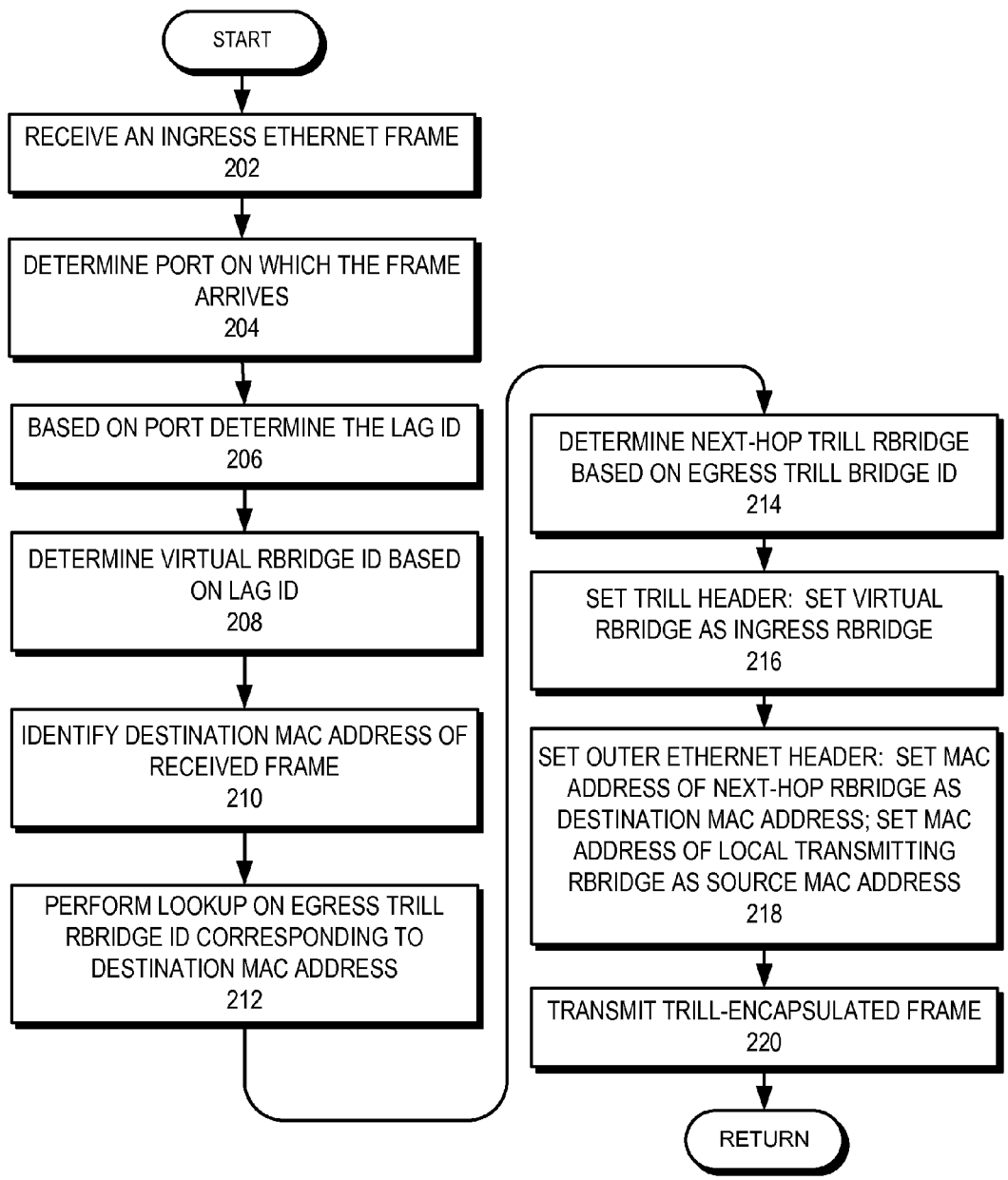
FIG. 2 presents a flowchart illustrating the process of configuring the TRILL header of an ingress frame from a dual-homed end station at an ingress physical RBridge, in accordance with an embodiment of the present invention.

FIG. 2 presents a flowchart illustrating the process of configuring the TRILL header of an ingress frame from a dual-homed end station at an ingress physical RBridge, in accordance with an embodiment of the present invention. During operation, an RBridge participating in link aggregation receives an ingress Ethernet frame from an end station (operation 202). The RBridge then determines the port on which the frame arrives (operation 204). Based on the determine port, the RBridge further determines the LAG ID associated with the port (operation 206). Note that the port-to-LAG ID association is established during the link discovery process.

Subsequently, the RBridge determines the virtual RBridge ID based on the LAG ID (operation 208). (Note that the virtual RBridge ID can be directly derived from the LAG ID.) The RBridge then identifies the destination MAC address of the received frame (operation 210). Based on the destination MAC address, the RBridge performs a lookup on the egress TRILL RBridge nickname (operation 212). Next, the RBridge determines the next-hop TRILL RBridge based on the egress TRILL RBridge nickname (operation 214). (It is assumed that the routing function in the TRILL protocol or other routing protocol is responsible for populating the forwarding information base at each RBridge.)

Subsequently, the RBridge sets the TRILL header of the frame (operation 216). In doing so, the RBridge sets the virtual RBridge as the ingress RBridge for the frame. The egress RBridge of the TRILL header is set based on the result of operation 212.

The RBridge then sets the outer Ethernet header of the frame (operation 218). In doing so, the RBridge sets the MAC address of the next-hop RBridge (the result of operation 214) as the destination MAC address in the outer Ethernet header. The RBridge further sets the MAC address of the local transmitting RBridge as the source MAC address in the outer Ethernet header. After setting the outer Ethernet header, the RBridge transmits the TRILL-encapsulated frame to the next-hop RBridge (operation 220).

Figure 3:
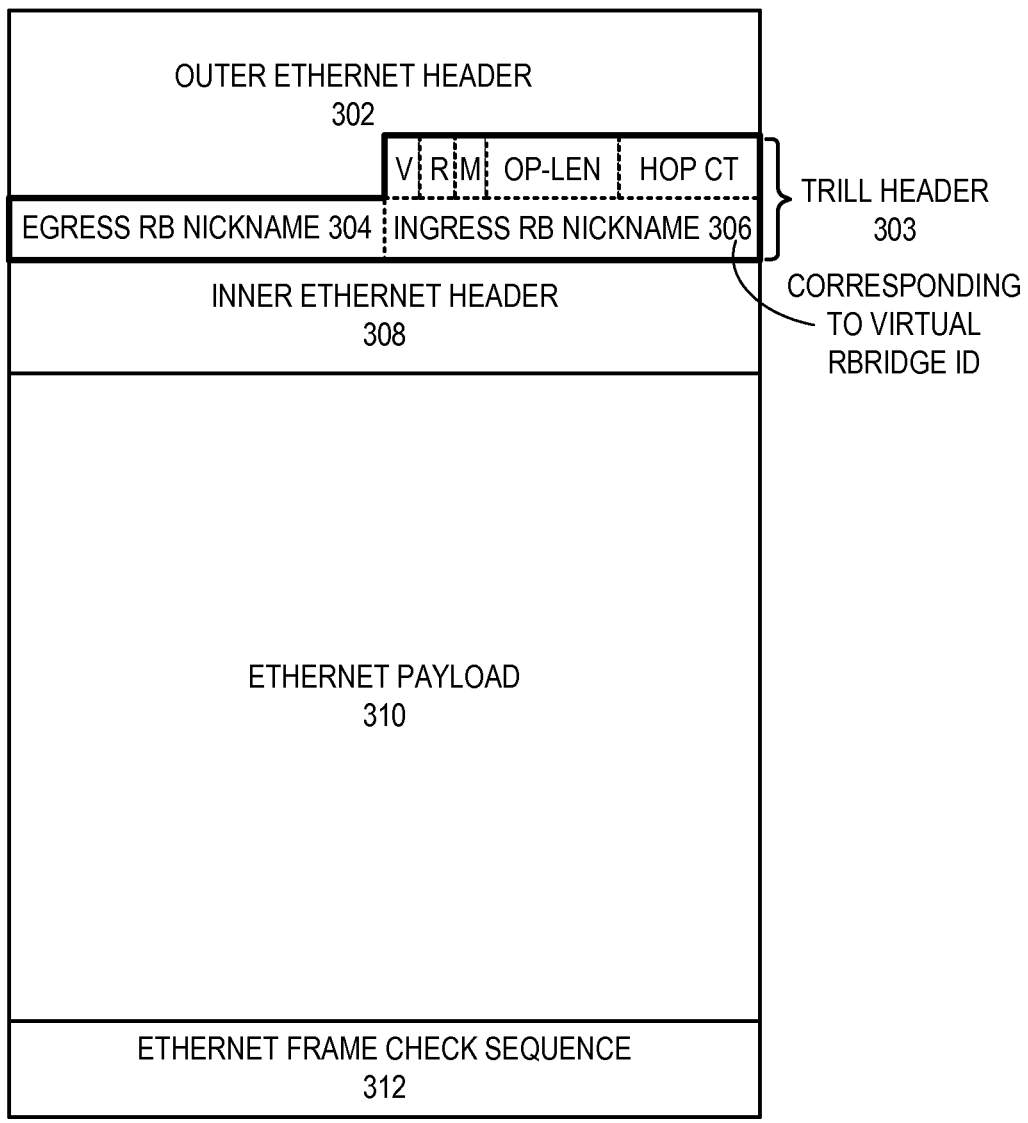
FIG. 3 illustrates an exemplary header configuration of an ingress TRILL frame which contains a virtual RBridge nickname in its ingress RBridge nickname field, in accordance with an embodiment of the present invention.

FIG. 3A illustrates an exemplary header configuration of an ingress TRILL frame which contains a virtual RBridge nickname in its ingress RBridge nickname field, in accordance with an embodiment of the present invention. In this example, a TRILL-encapsulated frame includes an outer Ethernet header 302, a TRILL header 303, an inner Ethernet header 308, an Ethernet payload 310, and an Ethernet frame check sequence (FCS) 312.

TRILL header 303 includes a version field (denoted as "V"), a reserved field (denoted as "R"), a multi-destination indication field (denoted as "M"), an option-field-length indication field (denoted as "OP-LEN"), and a hop-count field (denoted as "HOP CT"). Also included are an egress RBridge nickname field 304 and an ingress RBridge nickname field 306.

In some embodiments, in addition to carrying the virtual RBridge's nickname in the ingress RBridge nickname field, it is possible to include the physical ingress RBridge nickname in the TRILL option field. This configuration can facilitate end-to-end congestion notification and help with multicast pruning scenarios.

Furthermore, it is also possible to carry virtual RBridge identifier in the TRILL option field, instead of the source RBridge nickname field. The ingress RBridge nickname field of an incoming frame is used to carry the nickname of the physical ingress RBridge (which is one of the partner RBridges forming the virtual RBridge). This configuration allows other RBridges in the TRILL network to identify the actual, physical ingress RBridge as well as the virtual ingress RBridge.

Figure 4A:
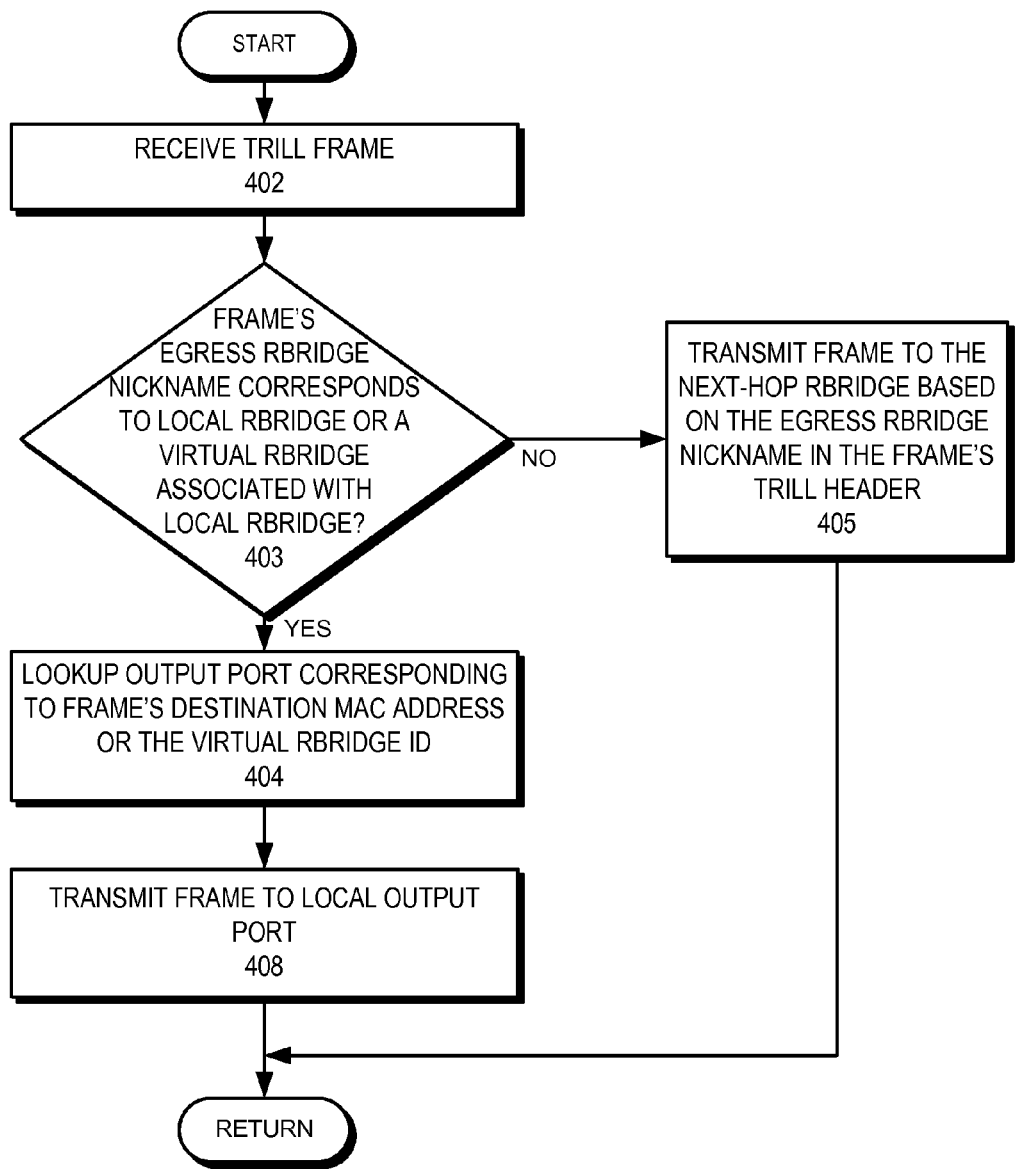
FIG. 4A presents a flowchart illustrating the process of forwarding a unicast TRILL frame at a partner RBridge which participates in link aggregation, in accordance with an embodiment of the present invention.

After a partner RBridge encapsulates an ingress frame with the proper TRILL and outer Ethernet headers and transmits the frame to its destination, it is expected to receive frames in the reverse direction from the destination in response to the transmission. FIG. 4A presents a flowchart illustrating the process of receiving and forwarding a unicast TRILL frame at a partner RBridge which participates in link aggregation, in accordance with an embodiment of the present invention.

During operation, a partner RBridge receives a TRILL frame (operation 402). The RBridge then determines whether the frame's egress RBridge nickname corresponds to the local RBridge or a virtual RBridge associated with the local RBridge (operation 403). If the frame's egress RBridge nickname matches neither the local RBridge nor a virtual RBridge associated with the local RBridge (i.e., the frame is not destined to the local RBridge), the RBridge transmits the frame to the next-hop RBridge based on the frame's egress RBridge nickname (operation 405).

On the other hand, if the condition in operation 403 is met, the RBridge then performs a lookup in its MAC-address table to identify an output port corresponding to the frame's destination MAC address in its inner Ethernet header if the egress RBridge nickname matches the local physical RBridge ID (operation 404). If the frame's egress RBridge nickname corresponds to the virtual RBridge, then the RBridge can determine the LAG ID corresponding to the virtual RBridge, and determine the output port associated with that LAG ID.

Note that the MAC reachability information is shared between the two partner RBridges forming the virtual RBridge. Hence, even if the RBridge has not received an ingress frame with the same source MAC address (i.e., the RBridge has not learned the MAC address locally), the RBridge can still determine that the destination MAC address is reachable via a local link based on the MAC reachability information shared from the partner RBridge. Subsequently, the RBridge transmits the frame to the local output port corresponding to the frame's destination MAC address in its inner Ethernet header (operation 408).

Failure Handling

Figure 5:
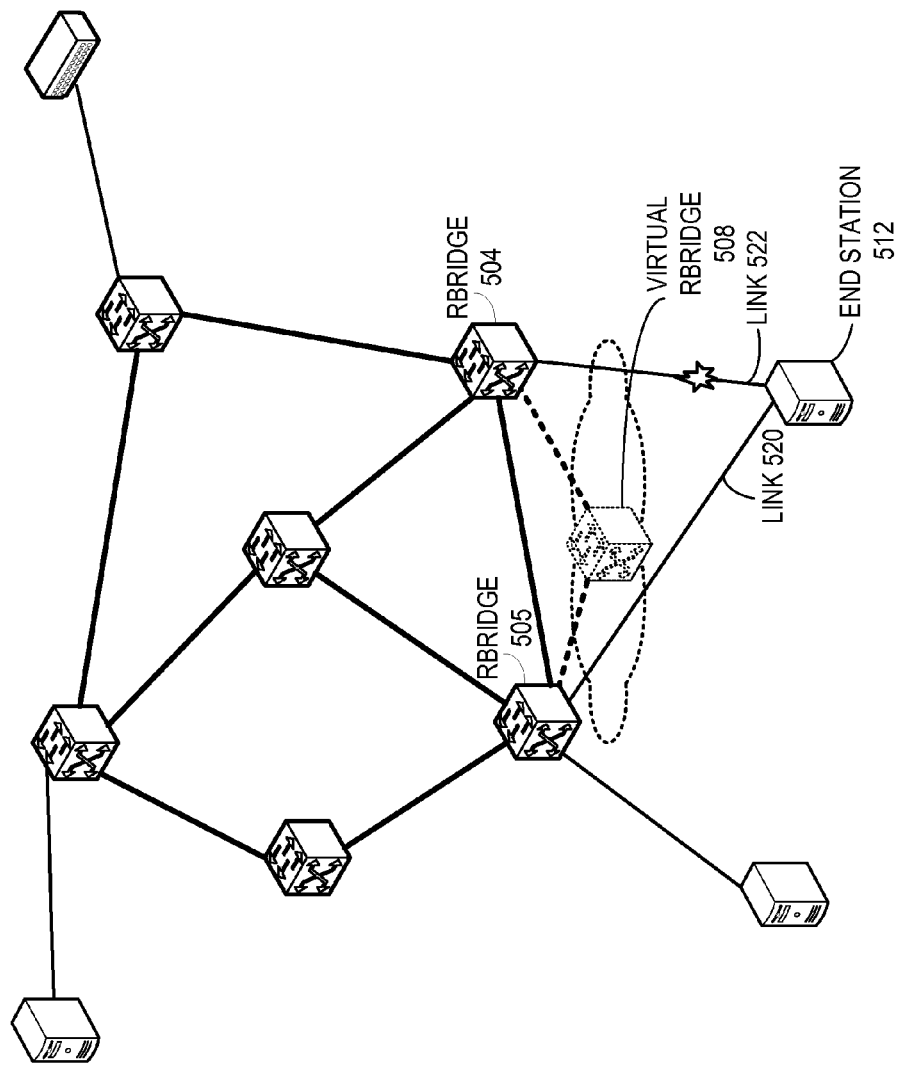
FIG. 5 illustrates a scenario where one of the physical links of a dual-homed end station experiences a failure, in accordance with an embodiment of the present invention.

FIG. 5 illustrates a scenario in which one of the physical links of a dual-homed end station experiences a failure, in accordance with an embodiment of the present invention. In this example, assume that an end station 512 is dual-homed with RBridges 505 and 504 via aggregate links In particular, end station 512 is coupled to RBridge 505 via link 520, and coupled to RBridge 504 via link 522. Links 520 and 522 form a LAG that corresponds to a virtual RBridge 508. RBridge 508's identifier is derived from the LAG ID. Suppose that link 522 fails during operation. RBridge 504 can detect this failure and notify RBridge 505.

As a result, RBridge 505 discontinues marking frames coming from end station 512 with the nickname of virtual RBridge 508. Instead, the source RBridge nickname for the frames from end station 512 are marked with RBridge 505's nickname. In other words, since end station 512 no longer has the aggregate link to both RBridges 505 and 504, virtual RBridge 508 no longer exists for end station 512. After the TRILL-encapsulated frames from end station 512 reach other egress RBridges in the network, these RBridges will learn that the MAC address corresponding to end station 512 is associated with RBridge 505, instead of virtual RBridge 508. Consequently, future frames destined to end station 512 will be sent to RBridge 505. Note that, during the topology convergence process, RBridge 504 may continue to receive frames destined to end station 512. RBridge 504 can flood these frames to all the ports (except the ports from which the frames are received), or optionally forward these frames to RBridge 505 so there is minimal data loss.

Figure 6:
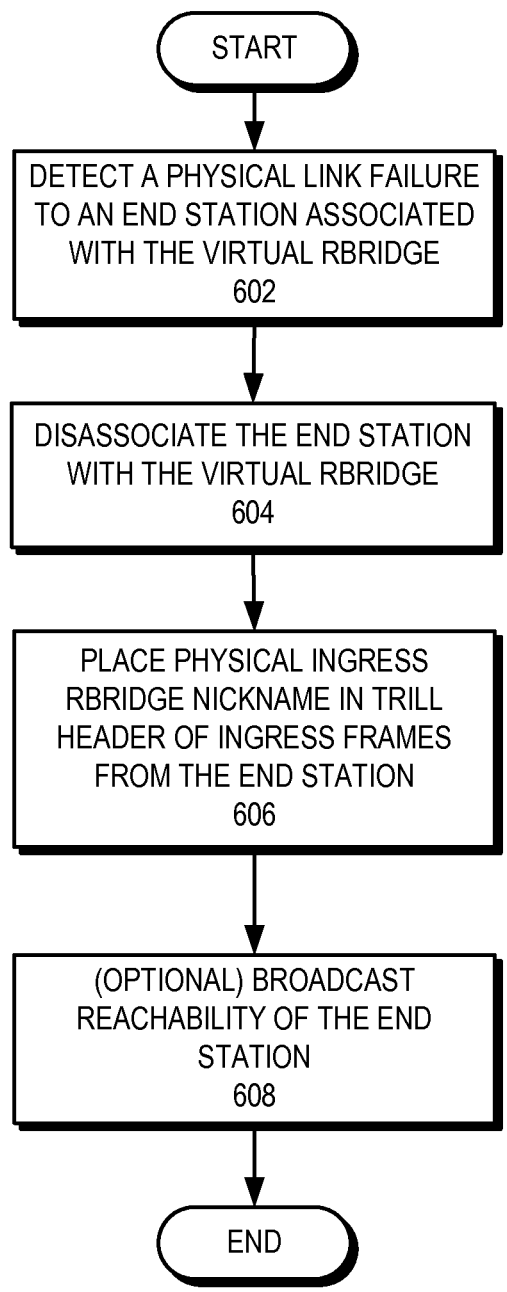
FIG. 6 presents a flowchart illustrating the process of handling a link failure that affects an end station associated with a virtual RBridge, in accordance with an embodiment of the present invention.

FIG. 6 presents a flowchart illustrating the process of handling a link failure that affects an end station associated with a virtual RBridge, in accordance with an embodiment of the present invention. During operation, a partner RBridge detects a physical link failure to an end station associated with the virtual RBridge (operation 602). The RBridge then disassociates the end station with the virtual RBridge (operation 604), and returns to the normal forwarding and/or flooding operation as for non-trunked ports. Furthermore, the RBridge places its own nickname (i.e., the physical ingress RBridge's nickname) in the source RBridge field in the TRILL header of ingress frames from the end station (operation 606). Optionally, the RBridge can broadcast the MAC reachability of the end station via its own RBridge identifier to other RBridges in the TRILL network (operation 608).

Multi-pathing

Embodiments of the present invention can also facilitate equal-cost or nearly-equal-cost multi-pathing. Take the network topology in FIG. 1 for example. Assume that end station 112 is in communication with end station 114. The shortest path traverses RBridge 104 and RBridge 103. As a result, traffic from end station 114 to end station 112 (which is destined to virtual RBridge 108) would always go through RBridge 104, instead of being split between RBridge 105 and RBridge 104.

In one embodiment, if traffic splitting is desired, the partner RBridges can advertise to the rest of the TRILL network that virtual RBridge 108 is equal to RBridge 104 and RBridge 105, e.g., via a message indicating $RB_x \rightarrow \{RB_1, RB_2\}$, where $RB_x$ denotes the virtual RBridge nickname, and $RB_1$ and $RB_2$ denote the physical RBridge nicknames. This can be done using control messages supported by existing routing protocols, such as the IS-IS protocol. As a result, for a given set of data flows, RBridge 103 can select RBridge 104 as the egress RBridge, whereas for other flows RBridge 103 can select RBridge 105 as the egress RBridge.

Exemplary Switch System

Figure 7:
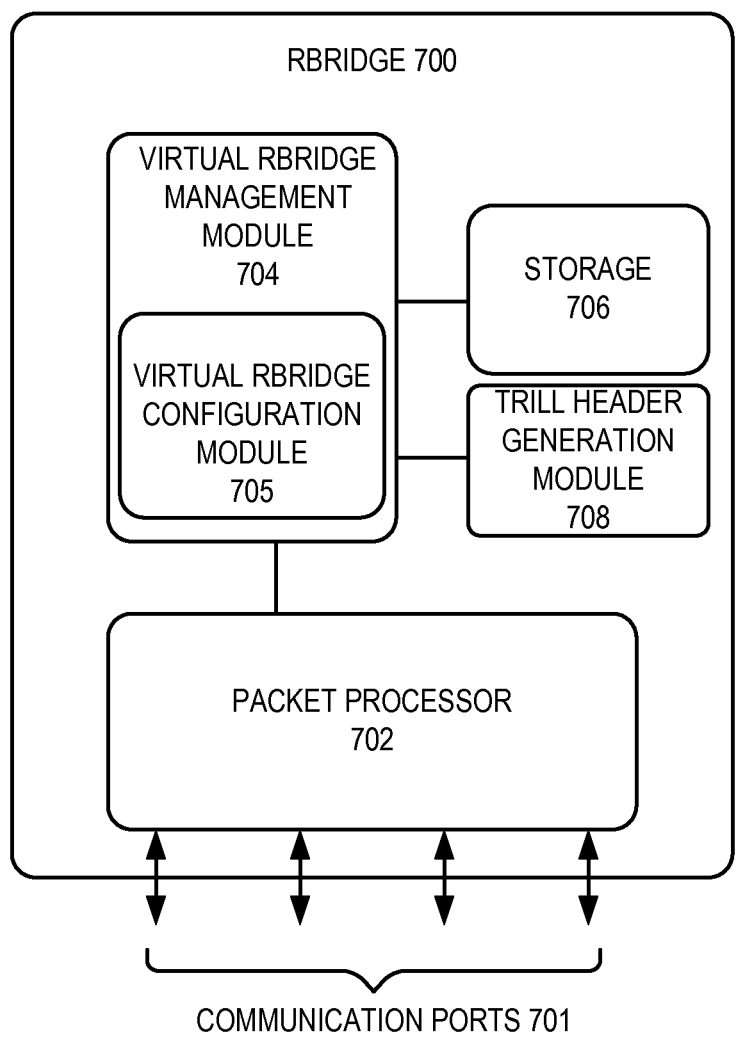
FIG. 7 illustrates an exemplary architecture of a switch that facilitates assignment of a virtual RBridge ID, in accordance with an embodiment of the present invention.

FIG. 7 illustrates an exemplary architecture of a switch that facilitates assignment of a virtual RBridge ID, in accordance with an embodiment of the present invention. In this example, an RBridge 700 includes a number of communication ports 701, a packet processor 702, a virtual RBridge management module 704, a virtual RBridge configuration module 705, a storage device 706, and a TRILL header generation module 708. During operation, communication ports 701 receive frames from (and transmit frames to) the end stations. Packet processor 702 extracts and processes the header information from the received frames. Packet processor 702 further performs routing on the received frames based on their Ethernet headers, as described in conjunction with FIG. 2. Note that communication ports 701 include at least one inter-switch communication channel for communication with one or more partner RBridges. This inter-switch communication channel can be implemented via a regular communication port and based on any open or proprietary format. Furthermore, the inter-switch communication between partner RBridges is not required to be direct port-to-port communication. Virtual RBridge management module 704 manages the communication with the partner RBridges and handles various inter-switch communication, such as MAC address information sharing and link failure notification.

Virtual RBridge configuration module 705 allows a user to configure and assign the identifier for the virtual RBridges. In one embodiment, virtual RBridge configuration module 705 derives a virtual RBridge ID from a LAG ID which is obtained during the link discovery and configuration process. It is also responsible for communicating with the partner RBridge(s) to share each other's MAC address reachability information, which is stored in storage 706. Furthermore, TRILL header generation module 708 generates the TRILL header for ingress frames corresponding to the virtual RBridge. Note that the above-mentioned modules can be implemented in hardware as well as in software. In one embodiment, these modules can be embodied in computer-executable instructions stored in a memory which is coupled to one or more processors in RBridge 700. When executed, these instructions cause the processor(s) to perform the aforementioned functions.

In summary, embodiments of the present invention provide a method and system for facilitating link aggregation across different switches in a routed network. In one embodiment, a virtual RBridge is formed to accommodate an aggregate link from an end station to multiple physical RBridges. The virtual RBridge is used as the ingress RBridge for ingress frames from the end station. Such configuration provides a scalable and flexible solution to link aggregation across multiple switches.

The methods and processes described herein can be embodied as code and/or data, which can be stored in a computer-readable nontransitory storage medium. When a computer system reads and executes the code and/or data stored on the computer-readable nontransitory storage medium, the computer system performs the methods and processes embodied as data structures and code and stored within the medium.

The methods and processes described herein can be executed by and/or included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of embodiments of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A switch, comprising: a forwarding module configurable to forward frames based on their Ethernet headers; a control module configurable to operate the switch in conjunction with a separate physical switch as a single logical switch and assign a virtual switch identifier to the logical switch, wherein the virtual switch identifier is associated with a link aggregation group; wherein the switch is a layer-2 switch capable of routing without requiring the network topology to be based on a spanning tree topology; and wherein the control module is further configurable to derive the virtual switch identifier based on an identifier for the link aggregation group.

2. The switch of claim 1, wherein the switch is a routing bridge configurable to operate in accordance with the Transparent Interconnection of Lots of Links (TRILL) protocol.

3. The switch of claim 1, wherein the control module is further configurable to derive the virtual switch identifier based on an identifier for the link aggregation group.

4. The switch of claim 1, wherein the virtual switch identifier is a virtual RBridge identifier in compliance with the TRILL protocol.

5. The switch of claim 1, wherein the link aggregation group is identified by a link aggregation group (LAG) identifier in accordance to the IEEE 802.1ax standard.

6. The switch of claim 1, wherein the switch is a router configurable to operate in accordance with the Internet Protocol (IP).

7. The switch of claim 1, wherein the switch is configurable to operate in accordance with the Multiprotocol Label Switching (MPLS) protocol.

8. A method, comprising:
   forwarding frames received at a switch based on their Ethernet headers;
   operating the switch in conjunction with a separate physical switch as a single logical switch;
   assigning a virtual switch identifier to the logical switch, wherein the virtual switch identifier is associated with a link aggregation group;
   wherein the switch is a layer-2 switch capable of routing without requiring the network topology to be based on a spanning tree topology; and deriving the virtual switch identifier based on an identifier for the link aggregation group.

9. The method of claim 8, further comprising performing a layer-2 routing function in accordance with the Transparent Interconnection of Lots of Links (TRILL) protocol.

10. The method of claim 8, further comprising deriving the virtual switch identifier based on an identifier for the link aggregation group.

11. The method of claim 8, wherein the virtual switch identifier is a virtual RBridge identifier in compliance with the Transparent Interconnection of Lots of Links (TRILL) protocol.

12. The method of claim 8, wherein the link aggregation group is identified by a link aggregation group (LAG) identifier in accordance to the IEEE 802.1ax standard.

13. The method of claim 8, further comprising placing the virtual switch identifier in the header of an ingress frame.

14. The method of claim 8, further comprising notifying a separate physical switch about the reachability of a media access control (MAC) address associated with a device coupled to the switch.

15. The method of claim 14, wherein upon detecting a failure of a link between the device and the separate physical switch, the method further comprises disassociating the device from the virtual switch.

16. The method of claim 14, wherein upon detecting a failure of a link between the device and the switch, the method further comprises notifying the separate physical switch of the failure via an inter-switch communication channel.

17. The method of claim 8, further comprising advertising that the virtual switch is equivalent to both the switch and the separate physical switch, thereby facilitating multi-path routing to or from a device coupled to both switches.

18. The method of claim 8, wherein the switch is a router configurable to operate in accordance with the Internet Protocol (IP).

19. The method of claim 8, wherein the switch is configurable to operate in accordance with the Multiprotocol Label Switching (MPLS) protocol.

20. A switch means, comprising:
   a forwarding means for forwarding frames based on their Ethernet headers;
   a control means for operating the switch in conjunction with a separate physical switch as a single logical switch and assigning a virtual switch identifier to the logical switch, wherein the virtual switch identifier is associated with a link aggregation group;
   wherein the switch is a layer-2 switch capable of routing without requiring the network topology to be based on a spanning tree topology; and wherein the control means is further for deriving the virtual switch identifier based on an identifier for thr link aggregation group.

21. The switch means of claim 20, wherein the virtual switch identifier is a virtual RBridge identifier in compliance with the Transparent Interconnection of Lots of Links (TRILL) protocol; and
   wherein the link aggregation group is identified by a link aggregation group (LAG) identifier in accordance to the IEEE 802.1ax standard.

22. The switch means of claim 20, wherein the switch is a router configurable to operate in accordance with the Internet Protocol (IP).

23. The switch means of claim 20, wherein the switch is configurable to operate in accordance with the Multiprotocol Label Switching (MPLS) protocol.

* * * * *